(12) United States Patent
Gagas

(10) Patent No.: US 11,560,699 B1
(45) Date of Patent: Jan. 24, 2023

(54) CURB STOP STRUCTURE

(71) Applicant: ADAPTOR, INC., West Allis, WI (US)

(72) Inventor: Paul Michael Gagas, Muskego, WI (US)

(73) Assignee: ADAPTOR, INC., West Allis, WI (US)

( * ) Notice: Subject to any disclaimer, the term of this patent is extended or adjusted under 35 U.S.C. 154(b) by 0 days.

(21) Appl. No.: 17/588,990

(22) Filed: Jan. 31, 2022

(51) Int. Cl.
*E03B 7/09* (2006.01)
*E03B 9/08* (2006.01)
*F16K 27/12* (2006.01)

(52) U.S. Cl.
CPC ............... *E03B 7/095* (2013.01); *E03B 9/08* (2013.01); *F16K 27/12* (2013.01); *Y10T 137/6999* (2015.04)

(58) Field of Classification Search
CPC ... E03B 7/095; E03B 9/04; E03B 9/06; E03B 9/08; E03B 9/10; E03B 9/12; F16K 27/12; F16K 27/006; Y10T 137/5462; Y10T 137/5468; Y10T 137/6991–7028; Y10T 137/7043–7065; Y10T 137/5456
USPC .............. 137/294–295, 363–373, 377–382.5
See application file for complete search history.

(56) References Cited

U.S. PATENT DOCUMENTS

| | | | |
|---|---|---|---|
| 407,955 A * | 7/1889 | Kallaher et al. | ........ F16K 31/46 220/3.7 |
| 613,652 A | 11/1898 | Chadbourne | |
| 1,484,699 A | 2/1924 | Beagle | |
| 1,501,511 A | 7/1924 | Beagle | |
| 1,578,885 A | 3/1926 | Flinn | |
| 2,008,138 A | 7/1935 | LeDuc | |
| 2,691,384 A | 10/1954 | Mueller et al. | |
| 3,674,169 A | 7/1972 | Miller | |
| 3,901,271 A | 8/1975 | Stewart | |
| 4,030,519 A * | 6/1977 | Zinn | ....................... F16K 27/12 137/364 |
| 4,239,056 A | 12/1980 | Shope | |
| 4,308,886 A | 1/1982 | Handley et al. | |
| 4,310,015 A | 1/1982 | Stewart et al. | |
| 4,572,236 A | 2/1986 | Baker | |
| 4,691,733 A | 9/1987 | Zinn | |
| 4,905,725 A | 3/1990 | Sinkinson et al. | |
| 4,976,366 A | 12/1990 | Russell | |
| 5,327,925 A | 7/1994 | Ortel | |
| 5,730,180 A | 3/1998 | Alberico | |
| 5,983,925 A | 11/1999 | Miller | |
| 6,530,576 B1 * | 3/2003 | Earl | ........................ F16K 27/12 137/381 |
| 6,749,080 B1 * | 6/2004 | White | ..................... E03B 7/095 137/381 |
| 7,032,616 B1 * | 4/2006 | Calhoun | ................. F16K 27/12 137/381 |
| 7,117,883 B1 | 10/2006 | Vitalo | |

(Continued)

FOREIGN PATENT DOCUMENTS

GB 2374132 A 10/2002
KR 200385736 5/2005

(Continued)

*Primary Examiner* — Kevin F Murphy
*Assistant Examiner* — Jonathan J Waddy
(74) *Attorney, Agent, or Firm* — Ryan Kromholz & Manion, S.C.

(57) ABSTRACT

A curb stop structure having a supporting base, an upstanding body having an open top, the body including at least one horizontal slit and one vertical slit intersecting the horizontal slit.

8 Claims, 6 Drawing Sheets

(56) References Cited

U.S. PATENT DOCUMENTS

| | | |
|---|---|---|
| D764,637 S | 8/2016 | Ducote et al. |
| 9,518,369 B2 | 12/2016 | Ducote et al. |
| D936,801 S | 11/2021 | Truesdel |
| 2006/0254649 A1 | 11/2006 | Cotugno et al. |
| 2008/0023077 A1 | 1/2008 | Weisz et al. |
| 2018/0238031 A1* | 8/2018 | Kulzer .................... E03B 7/095 |
| 2021/0246637 A1 | 8/2021 | Truesdel |

FOREIGN PATENT DOCUMENTS

| | | |
|---|---|---|
| KR | 102047509 | 11/2019 |
| KR | 102325687 | 11/2021 |

\* cited by examiner

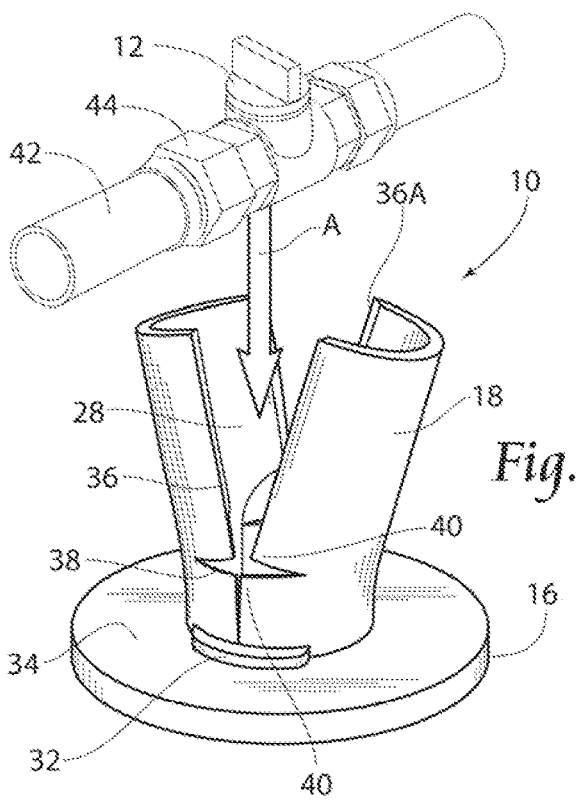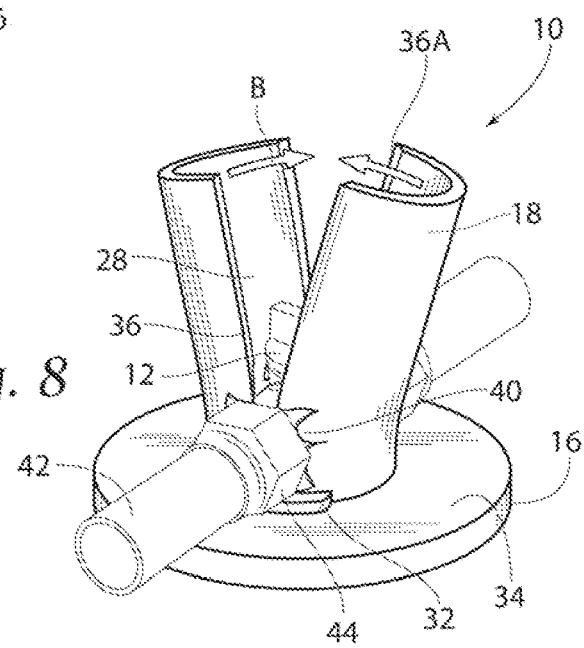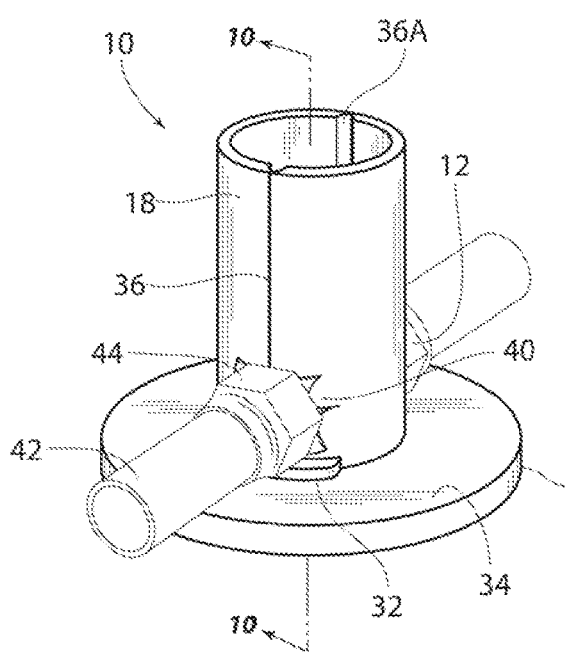

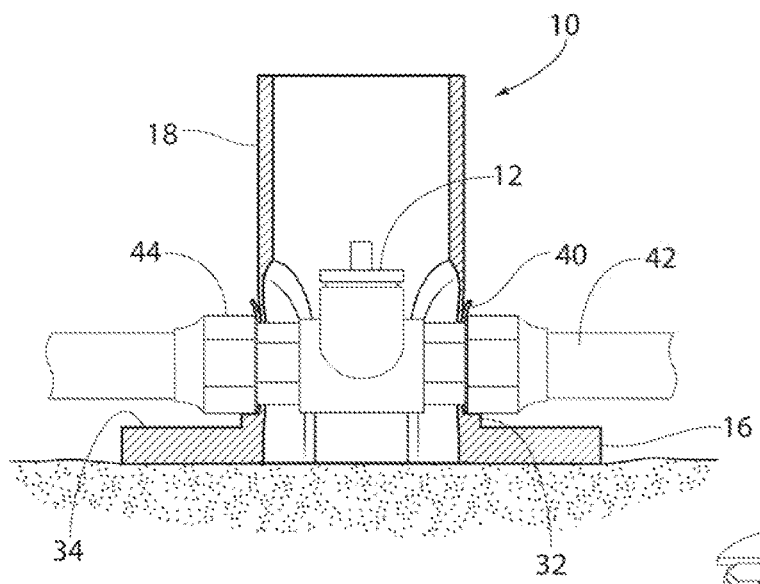
Fig. 10
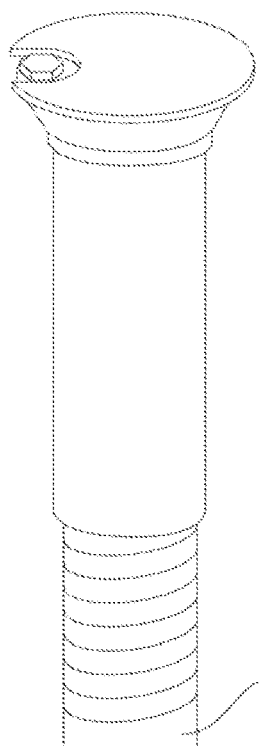
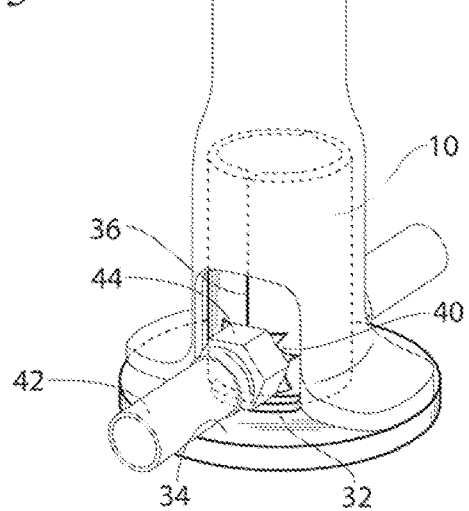
Fig. 11

CURB STOP STRUCTURE

BACKGROUND OF THE INVENTION

The present invention is related to curb stop construction and more specifically, to alignment, sealing and protective structures for curb stop valves. Curb stop valves are water service shutoff valves that are typically located underground in the water supply piping between the water main and a building. Curb stop valves are used to control the flow of water and other fluids through underground piping and to regulate the flow of water to the building. The valves are buried in the ground and are normally enclosed in a curb stop box that protects the valve during use and further allows access to the underground valve, should the need arise. Proper alignment of the valve in the curb box is important during installation and subsequent use to ensure that the valve remains in good operating order and is easily accessible for maintenance, if needed. The present invention provides a curb stop structure that is easy to use while providing accurate alignment and protection of the curb stop valve. The present structure further limits infiltration of liquids or other debris into the curb stop valve area while also providing secure positioning and alignment of the curb stop valve.

SUMMARY OF THE INVENTION

The present invention relates generally to the field of curb stop valve construction, and specifically to structures that are user friendly during installation while providing facile alignment of a curb stop valve. Once installed, such structures maintain alignment of the valve during use and limit the infiltration of liquid and debris into the curb stop valve area. In general, the curb stop structure of the present invention assists the user in positioning the curb stop valve in the curb box during installation and maintains valve alignment in the curb stop box during use by preventing misalignment or other movement of the valve to non-working positions. Moreover, the structure protects the valve from infiltration of debris or other unwanted matter during use. The structure may include a supporting base and an upstanding body having an open top. The body includes at least one horizontal slit and one vertical slit intersecting the horizontal slit.

BRIEF DESCRIPTION OF THE DRAWINGS

FIG. 7 is a perspective view, similar to that of FIG. 2, but showing a curb stop valve assembly being installed in the structure;

FIG. 8 is a perspective view, similar to FIG. 7, and showing further installation of a curb stop valve assembly;

FIG. 9 is a view similar to that of FIGS. 7 and 8, and showing a curb stop valve seated in the structure;

FIG. 10 is a sectional view of the structure illustrated in FIG. 9 and taken along lines 10-10 thereof;

FIG. 11 is a view similar to that of FIG. 9, but further showing a curb stop valve assembly with the structure partially;

DESCRIPTION OF THE PREFERRED EMBODIMENT

Figure 1:
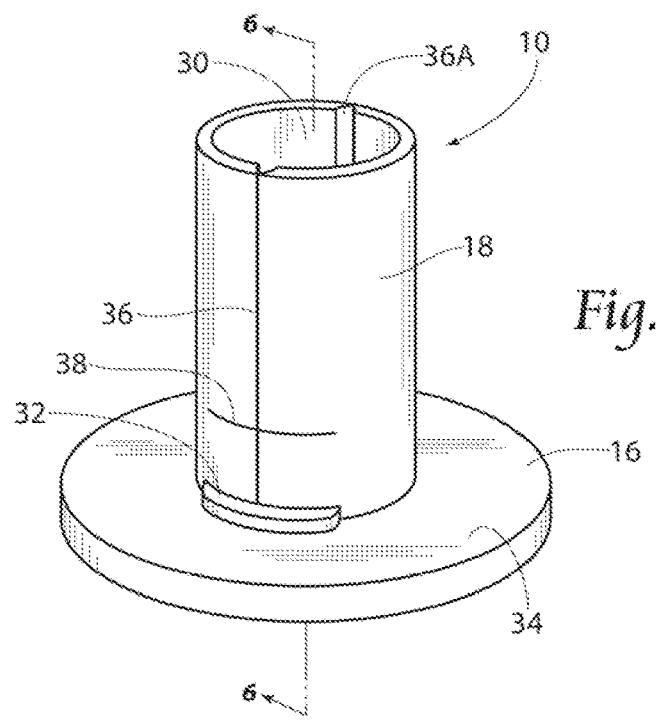
FIG. 1 is a perspective view of a curb stop structure according to the present invention.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

A curb stop structure 10 according to the present invention may be viewed in the Figures. The curb stop structure 10 is for use during installation of a curb stop valve 12 and during use of a curb stop valve 12. As mentioned, curb stop valves 12 are typically located underground and require adequate protection and alignment to ensure proper functioning, easy access, should it be required, and to promote longevity of the valve. The views of FIGS. 10 and 11 illustrate a typical curb stop valve 12 in a curb stop box 14, with the structure 10 according to the present invention, shown in phantom in place during use (see particularly FIG. 11).

With attention to FIGS. 1-6, the curb stop structure 10 may be seen. As illustrated, the structure 10 generally includes a supporting base 16 and a body 18 upstanding normal to the base 16. It is to be understood that while the base 16 is shown as circular, the supporting base 16 may be of any shape that is sized and configured to fit within a curb stop box 14. Likewise, the body 18 may be of any shape, but is preferably cylindrical, as seen in the Figures. With attention to FIG. 6, the body 18 may be seen to include a wall 20 having an inner wall surface 22 and an outer wall surface 24. As shown, the wall 20 preferably has a first predetermined thickness T as measured from the outer wall surface 24 to the inner wall surface 22, and an area 26 having second predetermined thickness T'. The second predetermined thickness T' being less than the first predetermined thickness T. Further, and as will be discussed, the area 26 having second predetermined thickness T' is preferably located adjacent to the base 16. The upstanding body 13 further includes an interior 28 and open top 30.

Figure 2:
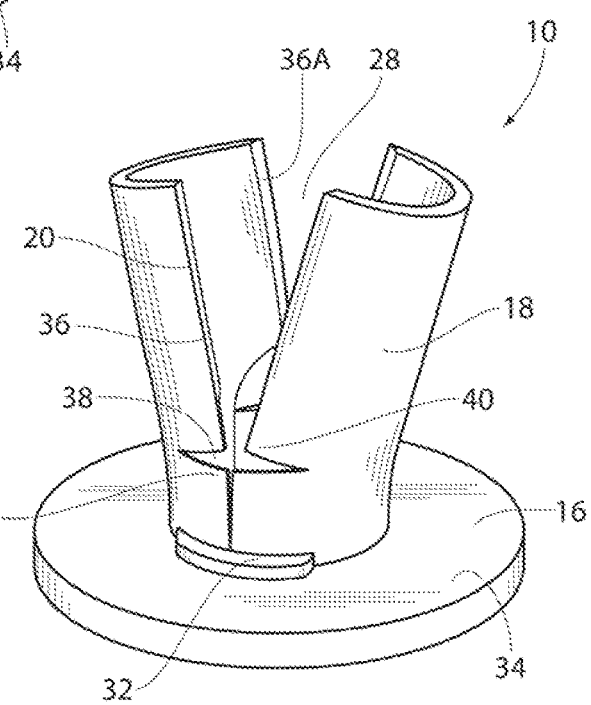
FIG. 2 is a view similar to that of FIG. 1, but showing the structure in the open position.
Figure 3:
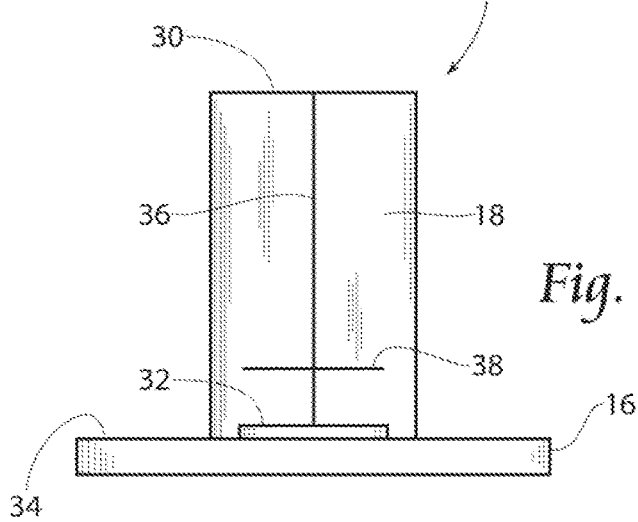
FIG. 3 is a front view of the structure illustrated in FIG. 1.
Figure 4:
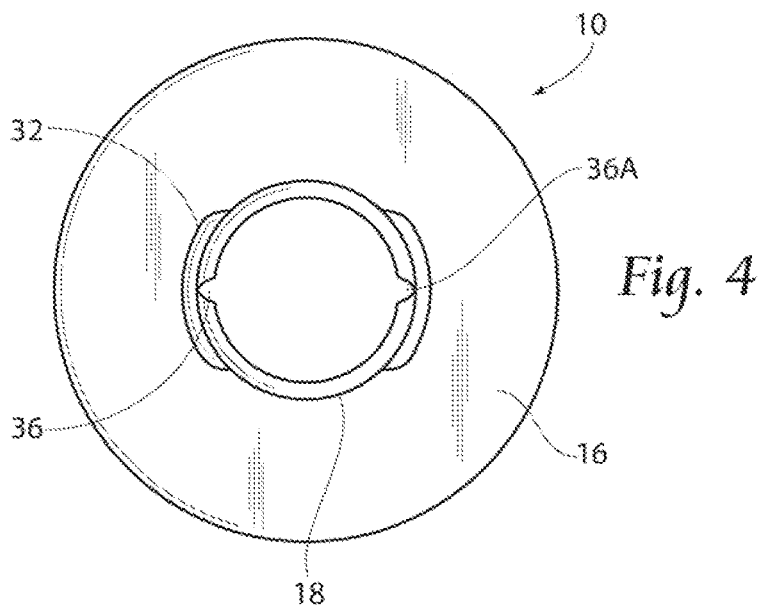
FIG. 4 is a top view of the structure illustrated in FIGS. 1 and 3.
Figure 5:
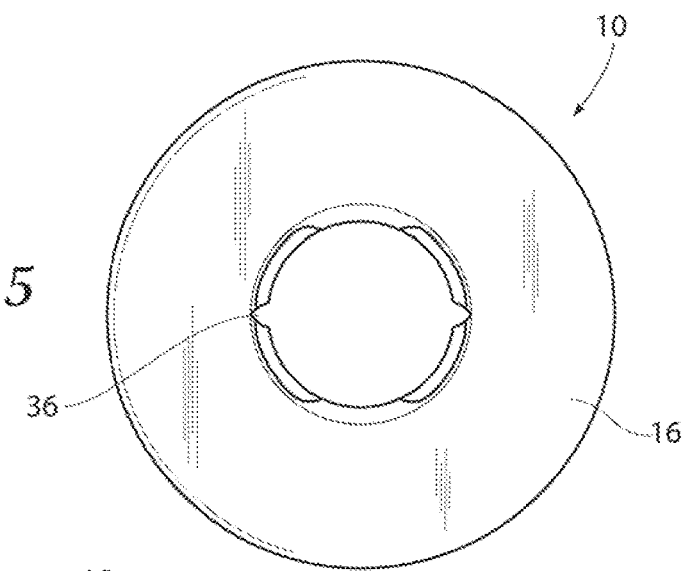
FIG. 5 is a bottom view of the structure illustrated in FIGS. 1, 3, and 4.
Figure 6:
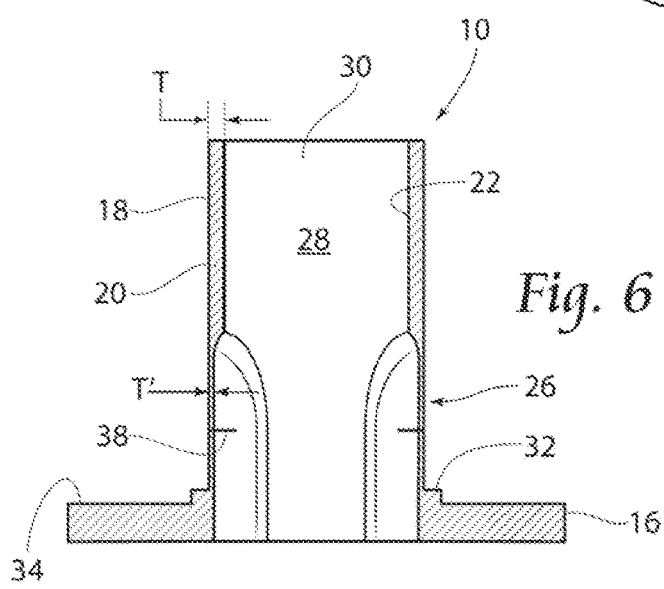
FIG. 6 is a sectional view of the structure illustrated in FIG. 1 and taken along lines 6-6 thereof.

As seen particularly in FIGS. 1-3, the structure 10 may be seen to include at least one abutment member 2. The abutment member 32 being located on the top surface 34 of base member 16 and adjacent to the outer wall surface 24 of the body 18. The abutment member 32 may extend around the wall 20 of the body 18, but preferably extends around a portion of the wall 20, as is shown. Further, the abutment member 32 may be integrally formed with the base member 1f, the body 18, or both, and preferably extends upwardly from the top surface 34 of the base member 16.

As further seen in the Figures, the body 18 includes at least one vertical slit 36. The vertical slit 36 is preferably aligned with the abutment member 32 and extends from the open top 30 downwardly toward, but not through, the abutment member 32. Moreover, and as shown, the structure 10 may include a second vertical slit 36A. The first and second vertical slits 36, 36A being equally spaced from one another around the body 18 such that they are aligned diametrically opposite each other. As will be discussed, during installation of the curb stop valve 12, the aligned vertical slits 36, 36A intersect the body 18 and allow an outward flexion, as shown in FIG. 2.

With further attention to FIGS. 1-3, it may be seen that the body 18 may further include at least one, preferably two horizontal slits 38. As shown, each horizontal slit 38 intersects a selected vertical slit 36, 36A to provide flexible flaps 40 adjacent the slits 36, 36A, 38. The horizontal slits 38 and flaps 40 are located in the area 26 having a second predetermined thickness T'. As mentioned, area 26 has a wall thickness T' that is less than other portions of the wall, to thereby allow the vertical and horizontal slits 36, 36A, 38 and flaps 40 to flex. The flaps 40 flex to allow insertion of the curb stop valve 12 and pipe 42 there through and further to the engage secure the curb stop valve 12 and pipe 42 in operable position. Once properly seated in the interior 28 of the structure 10, the flaps 40 hold and further align the curb stop valve 12 and pipe 42 in the curb box 14. Moreover, once installation is complete, the flaps 40 aid in preventing infiltration of water and debris into the curb box 14.

With reference to FIGS. 7-11, use of the structure 10 during installation of a curb stop valve 12 may be seem. As shown, the body 18 flexes outwardly of the body interior 28 along the vertical slits 36, 36A. The curb stop valve 12 and supply pipe 42 with connector 44 are moved in the direction of arrow A and into the body interior 28. The supply pipe 42 with connector 44 are moved through the flaps 40 with the curb stop valve 12, being seated in alignment with the vertical slits 36, 36A. The pipe 42 and connector 44 are then secured against the abutment 32. Once the curb stop valve 12 and supply pipe 42 with connector 44 are properly aligned, the body 18 flexes inwardly in the direction of arrows B (see FIG. 8) to surround the curb stop valve 12. FIG. 9 illustrates a curb stop valve 12 and supply pipe 42 with connector 44 properly aligned and seated in the structure 10. FIG. 10 is a section view of a curb stop valve 12 properly aligned and seated in the structure 10, with FIG. 11 further illustrating the structure 10 in phantom and positioned within a curb stop box 14.

Figure 12A:
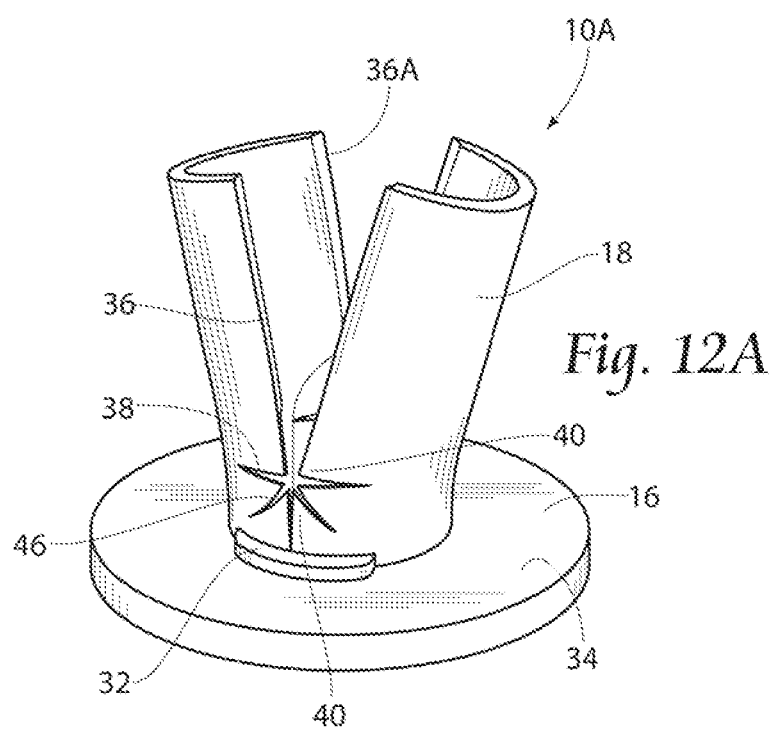
FIG. 12A is a perspective view illustrating a further embodiment of the curb stop structure.
Figure 12B:
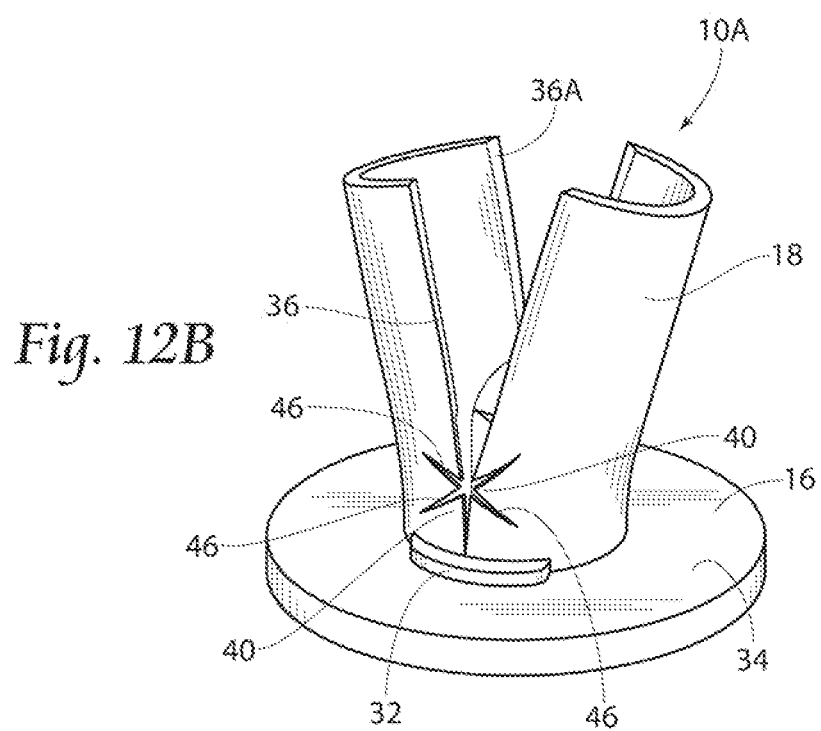
FIG. 12B is a perspective view, similar to that of FIG. 12A, but showing the curb stop structure in open position.

FIGS. 12A and 12B are perspective views of other embodiments of the structure 10. As shown, the structures 10A of these views illustrate other arrangements and numbers of slits intersecting the previously discussed vertical slit 36, 36A. For example, FIG. 12A illustrates the use of angled slits 46 in addition to the horizontal slits 38 illustrated in previous views. Moreover, FIG. 12B shows multiple slits 46 intersecting the vertical slit 36. It is to be understood that while several arrangements of slits have been illustrated, other numbers and configurations of slits 38, 46 intersecting the vertical slit 36 may be envisioned without departing from the present invention.

Figure 13:
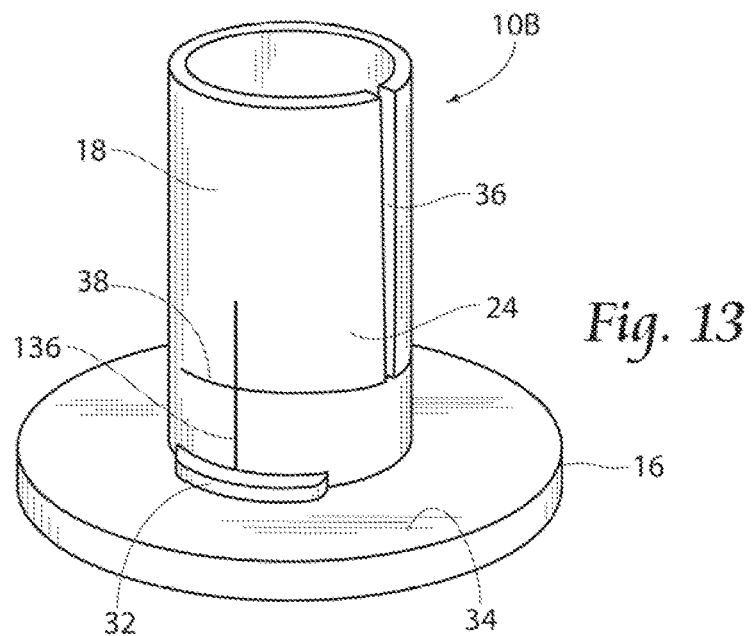
FIG. 13 is a perspective view illustrating a further embodiment of the curb stop structure.
Figure 14:
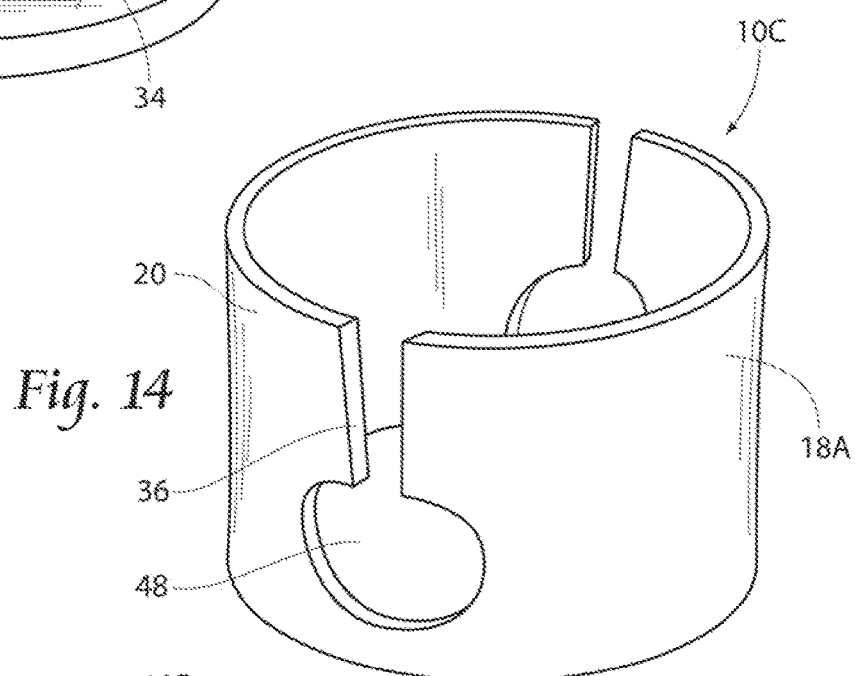
FIG. 14 is a perspective view illustrating a further embodiment of the curb stop structure.
Figure 15:
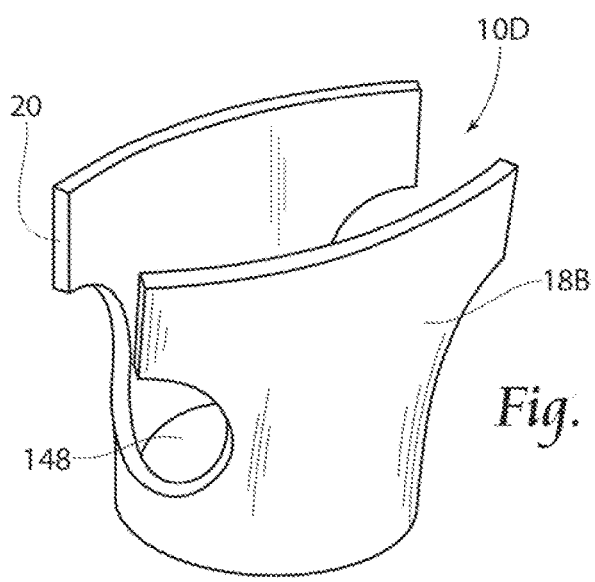
FIG. 15 is a perspective view illustrating a further embodiment of the curb stop structure.

The views of FIGS. 13-15, illustrate other embodiments of a structure 10 according to the present invention. FIG. 13 is a perspective view of another embodiment of the structure 10B wherein the body 1, may further include one vertical slit 36 extending from the open top 30 to a location above the base top surface 34, and a second vertical slit 136 extending from the abutment 32. As shown, a horizontal slit 36 intersects the second vertical slit 136 and extends around a portion of the wall 20. As in the previous embodiment, the abutment member 32 is located on the top surface 34 of base member 16 and adjacent to the outer wall 24 of the body 18. As mentioned earlier, the abutment member 32 may extend around the outer wall 24 of the body 18, but preferably extends around a portion of the outer wall 22, as shown.

FIG. 14 is a perspective view of another embodiment of the structure 10. As shown, the structure 1C includes a body 18A having vertical slits 36 each extending from the open top 30 to an aperture 46. Similar to the device illustrated in FIGS. 1-11, the vertical slits 36 and apertures 48 are equally spaced from one another around the body 18A such that they are aligned diametrically opposite each other.

FIG. 15 is a perspective view of another embodiment of the structure 10. As shown, the structure 10D includes a body 18B having elongated apertures 148 each extending from the open top 30 and partially through the body wall 20. Similar to the structures illustrated in FIGS. 1-11, and 14 the elongated apertures 148 are equally spaced from one another around the body 18B such that they are aligned diametrically opposite each other.

The curb stop structure 10, 10A, 10B, 10C, 10D of the present invention may be made from any material that provides sufficient rigidity to protect the curb stop valve 12 while further allowing for the flexibility needed for proper function. Some examples of acceptable materials include, by way of non-limiting example, rubber, polyurethane, urethane, polyethylene, plastic, or a composite. Moreover, the structure may be manufactured by known means such as by compression molding, injection molding, transfer molding, use of Vulcanized molds, and 3D printing, by way of non-limiting examples.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A curb stop structure including:
   a supporting base member having a top surface;
   a body upstanding normal to said top surface of said base member, said body having an open top, an interior, and a wall, said wall having an inner wall surface and an outer wall surface, wherein the wall has a first predetermined thickness and a first area having a second predetermined thickness, said second predetermined thickness being less than said first predetermined thickness; and
   a first abutment member, said first abutment member located on said top surface of said base member and adjacent to said outer wall surface of said body at said first area; and
   a first vertical slit, said first vertical slit being in alignment with said first abutment member and extending from said open top toward said first abutment member.

2. The curb stop structure of claim 1 further including:
   a second area having said second predetermined thickness, said second predetermined thickness being less than said first predetermined thickness;
   a second abutment member, said second abutment member located on said top surface of said base member and adjacent to said outer wall surface of said body at said second area; and a second vertical slit, said second vertical slit being in alignment with said second abutment member and extending from said open top toward said second abutment member, wherein said first and said second vertical slits are equally spaced from one another around said body in diametrically opposite alignment.

3. The curb stop structure of claim 2 wherein said first and second areas having said second predetermined thickness are located adjacent to said base member.

4. The curb stop structure of claim 3 further including at least one horizontal slit, said at least one horizontal slit located in one of said first and second areas having said second predetermined thickness and intersecting one of said first and said second vertical slits.

5. The curb stop structure of claim 2 wherein said area having said least one horizontal slit includes a plurality of flexible flaps adjacent said at least one horizontal slit.

6. The curb stop structure of claim 5 wherein said open top is configured to receive a curb stop valve and said flexible flaps are arranged to receive a supply pipe.

7. The curb stop structure of claim 3 further including a first horizontal slit, said first horizontal slit located in said first area having said second predetermined thickness and intersecting said first vertical slit; and a second horizontal slit, said second horizontal slit located in said second area having said second predetermined thickness and intersecting said second vertical slit.

8. The curb stop structure of claim 1 wherein said body is cylindrical.

\* \* \* \* \*